US008675971B2

(12) United States Patent
Rao

(10) Patent No.: US 8,675,971 B2
(45) Date of Patent: Mar. 18, 2014

(54) METHOD AND APPARATUS FOR CLASSIFYING IMAGE PIXELS

(75) Inventor: Umesh Rao, Corvallis, OR (US)

(73) Assignee: Aptina Imaging Corporation, George Town (KY)

( * ) Notice: Subject to any disclaimer, the term of this patent is extended or adjusted under 35 U.S.C. 154(b) by 344 days.

(21) Appl. No.: 13/240,245

(22) Filed: Sep. 22, 2011

(65) Prior Publication Data

US 2012/0243791 A1   Sep. 27, 2012

Related U.S. Application Data

(60) Provisional application No. 61/467,558, filed on Mar. 25, 2011.

(51) Int. Cl.
*G06K 9/62* (2006.01)
*G06K 9/40* (2006.01)

(52) U.S. Cl.
USPC ............................. 382/199; 382/228; 382/266

(58) Field of Classification Search
USPC ......... 382/299, 199, 133, 205, 233, 260, 268, 382/275, 279, 162, 228, 266, 244; 348/739, 348/744, 759, 760, 761; 358/471, 518, 403, 358/448, 527
See application file for complete search history.

(56) References Cited

U.S. PATENT DOCUMENTS

| | | | |
|---|---|---|---|
| 6,229,578 B1 * | 5/2001 | Acharya et al. | 348/607 |
| 7,116,820 B2 * | 10/2006 | Luo et al. | 382/167 |
| 7,346,224 B2 * | 3/2008 | Kong et al. | 382/261 |
| 7,602,987 B2 * | 10/2009 | Kuramoto | 382/254 |
| 7,659,930 B2 * | 2/2010 | Wu | 348/280 |
| 7,668,392 B2 * | 2/2010 | Yamada et al. | 382/268 |
| 8,224,076 B2 * | 7/2012 | Lin et al. | 382/165 |
| 8,224,109 B2 * | 7/2012 | Bosco et al. | 382/260 |
| 8,374,425 B2 * | 2/2013 | Naccari et al. | 382/165 |
| 8,401,311 B2 * | 3/2013 | Aoyama et al. | 382/224 |
| 8,532,428 B2 * | 9/2013 | Inoue | 382/275 |
| 2007/0030365 A1 | 2/2007 | Jerdev | |
| 2008/0152296 A1 | 6/2008 | Oh | |
| 2010/0034480 A1 | 2/2010 | Rao | |

OTHER PUBLICATIONS

Sukumar., Smart Algorithms for Correcting Pixel Clusters in Imaging Applications, IECON 2010 36th Annual Conference on IEEE Industrial Electronics Society, Nov. 2010, pp. 1193-1197.
Histogram, (Wikipedia free encyclopedia) retrieved from internet at http://en.wikipedia.org/wiki/Histogram, May 23, 2011.
Hirakawa et al., "Joint Demosaicing and Denoising", IEEE Transactions on Image Processing, vol. 15, No. 8, Aug. 2006, pp. 2146-2157.

* cited by examiner

*Primary Examiner* — Sheela Chawan

(57) ABSTRACT

A method of classifying pixels in an image is described that includes calculating for each target pixel in the image, a functional value based on a median value of a block of pixels including the target pixel and storing the functional value for each pixel. Pixels in the image are then analyzed to determine if they correspond to edges in the image and if so, are classified as edge pixels. Next the stored functional values are analyzed to define a flat area delimiting function for the image. The stored functional values that do not correspond to edge pixels are then analyzed to define an image detail delimiting function and the non-flat area pixels are classified as being either flat area pixels or detail pixels based on the flat area delimiting function and the detail delimiting function.

19 Claims, 8 Drawing Sheets

US 8,675,971 B2

METHOD AND APPARATUS FOR CLASSIFYING IMAGE PIXELS

CROSS REFERENCE TO RELATED APPLICATIONS

This application claims priority of U.S. Provisional Patent Application Ser. No. 61/467,558, filed Mar. 25, 2011, the contents of which are incorporated herein by reference.

FIELD OF THE INVENTION

The present invention concerns image analysis and, in particular, a method for identifying image pixels corresponding image detail in an image produced by an electronic imager.

BACKGROUND OF THE INVENTION

Images acquired by semiconductor imaging devices are processed for a variety of reasons. These images may include a number of defects some caused by the imager itself and some occurring in the material that is being imaged. It may be desirable to process these images to mitigate the defects. In addition, it may be desirable to analyze a captured image to determine its focus level. In another example, it may be desirable to classify different areas of an image by their characteristics. For example, an image may include edges, non-edge detail and relatively flat regions. An image compression or image correction process performed on each of these regions may use different processing techniques.

DETAILED DESCRIPTION

Figure 1:
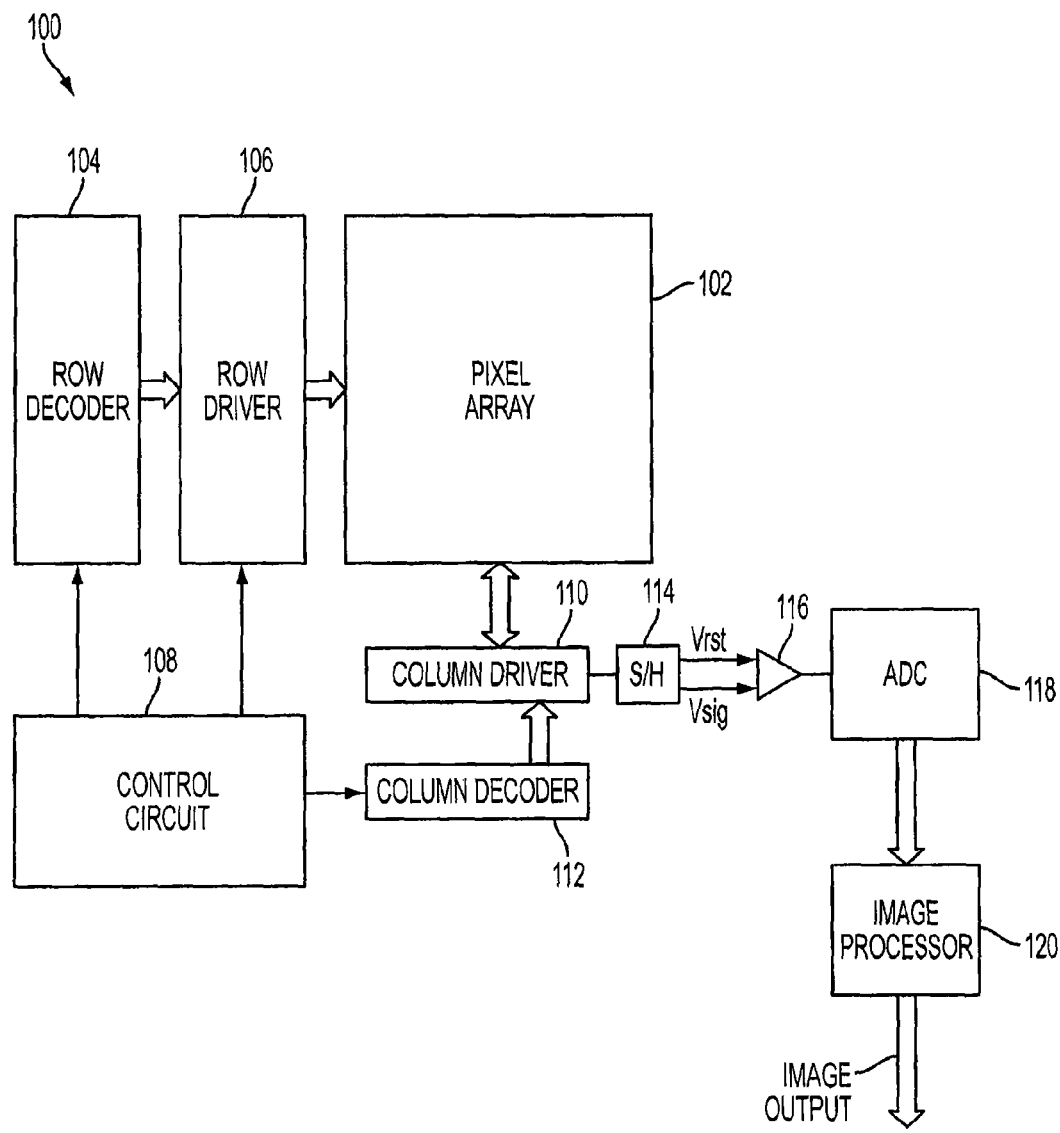
FIG. 1 is a block diagram of an example imaging system that may be used to capture and analyze an image using methods according to example embodiments of the invention.

FIG. 1 illustrates an example imaging device 100 having a pixel array 102. Row lines of the array 102 are selectively activated by a row driver 106 in response to row address decoder 104. A column driver 110 and column address decoder 112 are also included in the imaging device 300. The imaging device 100 is operated by the timing and control circuit 108, which controls the address decoders 104 and 112. The control circuit 108 also controls the row and column driver circuitry 106 and 110.

A sample and hold circuit 114 associated with the column driver 110 reads a pixel reset signal Vrst and a pixel image signal Vsig for selected pixels of the array 102. A differential signal (Vrst−Vsig) is produced by differential amplifier 116 for each pixel and is digitized by analog-to-digital converter 118 (ADC). The analog-to-digital converter 118 supplies the digitized pixel signals to an image processor 120 which forms and may output a digital image. The image processor 120 has a circuit that is capable of performing the image analysis process, described below, on images captured by pixel array 102.

Figure 2:
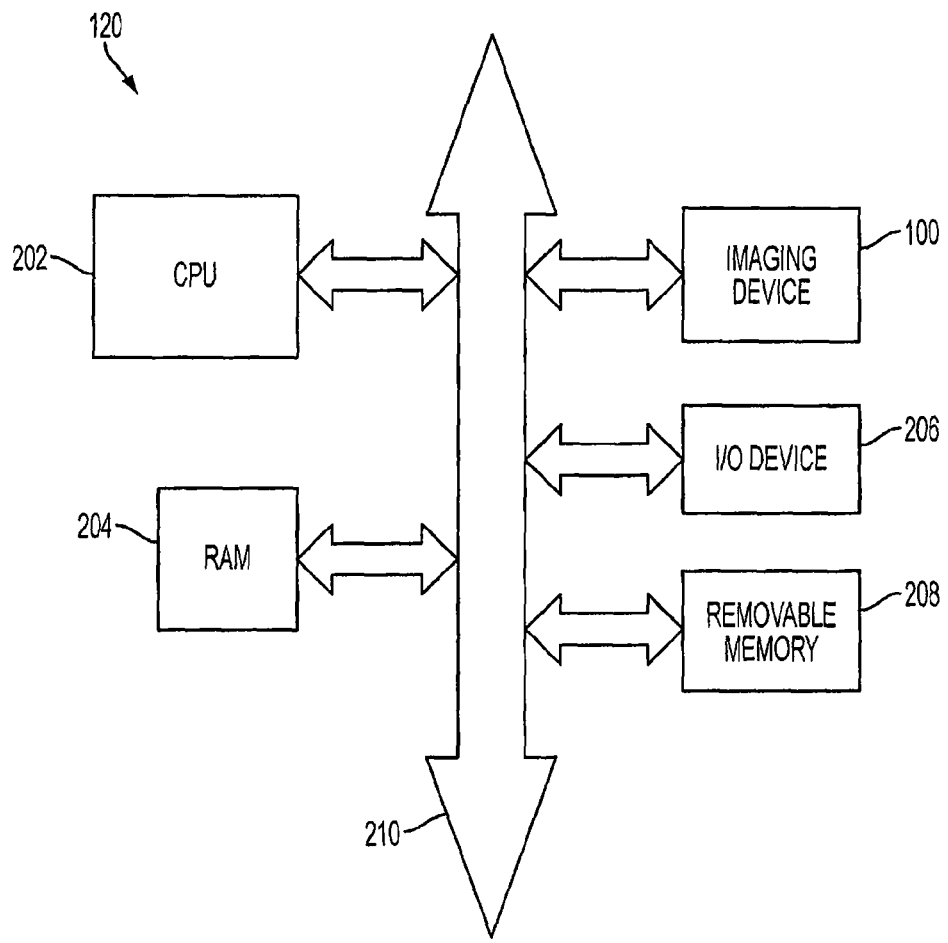
FIG. 2 is a block diagram of an example image processor suitable for use with the imaging system shown in FIG. 1.

FIG. 2 shows an example image processing system 120, a typical processing modified to include the imaging device 100, shown in FIG. 1. The system 120 is an example of a system having digital circuits that could include image sensor devices. Without being limiting, such a system could include a computer system, still or video camera system, scanner, machine vision, video phone, and auto focus system, or other imager applications.

System 120, for example an image analysis system, may include a central processing unit (CPU) 202, such as a microprocessor, digital signal processor or both, that communicates with an input/output (I/O) device 206 over a bus 210. Imaging device 100 also communicates with the CPU 202 over the bus 210. The processor-based system 120 also includes random access memory (RAM) 204, and may include removable memory 208, such as flash memory, which also communicate with the CPU 202 over the bus 210. The imaging device 100 may be combined with a processor, such as a CPU, digital signal processor, or microprocessor, with or without memory storage on a single integrated circuit or on a different chip than the processor.

The image processing described below may be implemented in computer software running on the image analysis system. In addition, it is contemplated that this software may be embodied in a non-transitory computer readable medium, for example, a DVD ROM, CD-ROM or flash memory.

Figure 3:
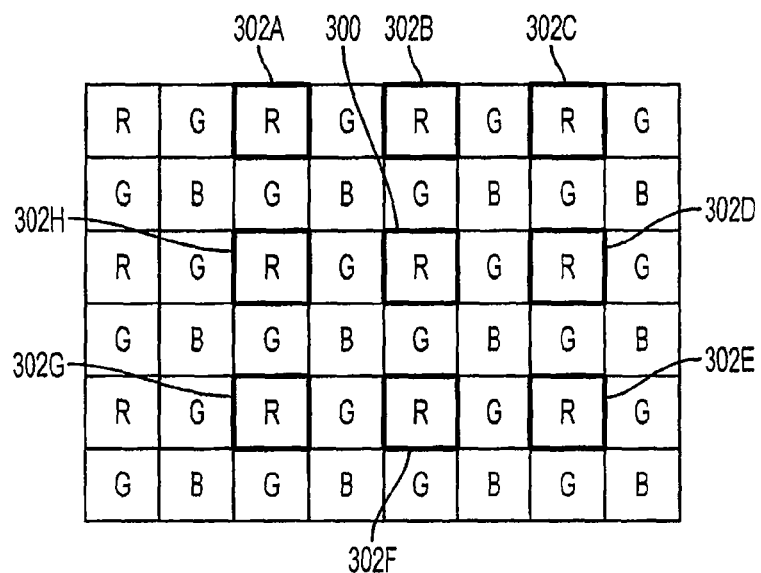
FIG. 3 is a pixel diagram that is useful for describing an example image analysis process.

FIG. 3 is a pixel diagram that is useful for describing the operation of the example embodiments described below. FIG. 3 illustrates a portion of an imager that is formed with color pixels conforming to the Bayer pattern. In this pattern, one line of the imager has pixels that are alternately sensitive to blue and green pixels while the pixels in the next line of the imager are alternately sensitive to red and green pixels. In the example embodiments described below, pixels of each color are separately classified to determine if they are along an edge in the image, in an area of the image containing non-edge detail or in a generally flat area of the image where variances in the pixels relative to their neighbors may be due to noise.

FIG. 3 shows a central red pixel 300 surrounded by eight other red pixels 302A-302H. The example image analysis process described below operates on similar blocks of blue pixels and green pixels. It is noted that there are a larger number of green pixels surrounding a center green pixel. The example image analysis process described below may operate on this larger number of green pixels or it may operate according to the pattern shown in FIG. 3.

The image analysis processes described below operate on the block of pixels, 300 and 302A-302H shown in FIG. 3 by identifying certain pixel values in the set: the median value, the next-to-largest pixel value and the next-to-smallest pixel value in the block.

Figure 4:
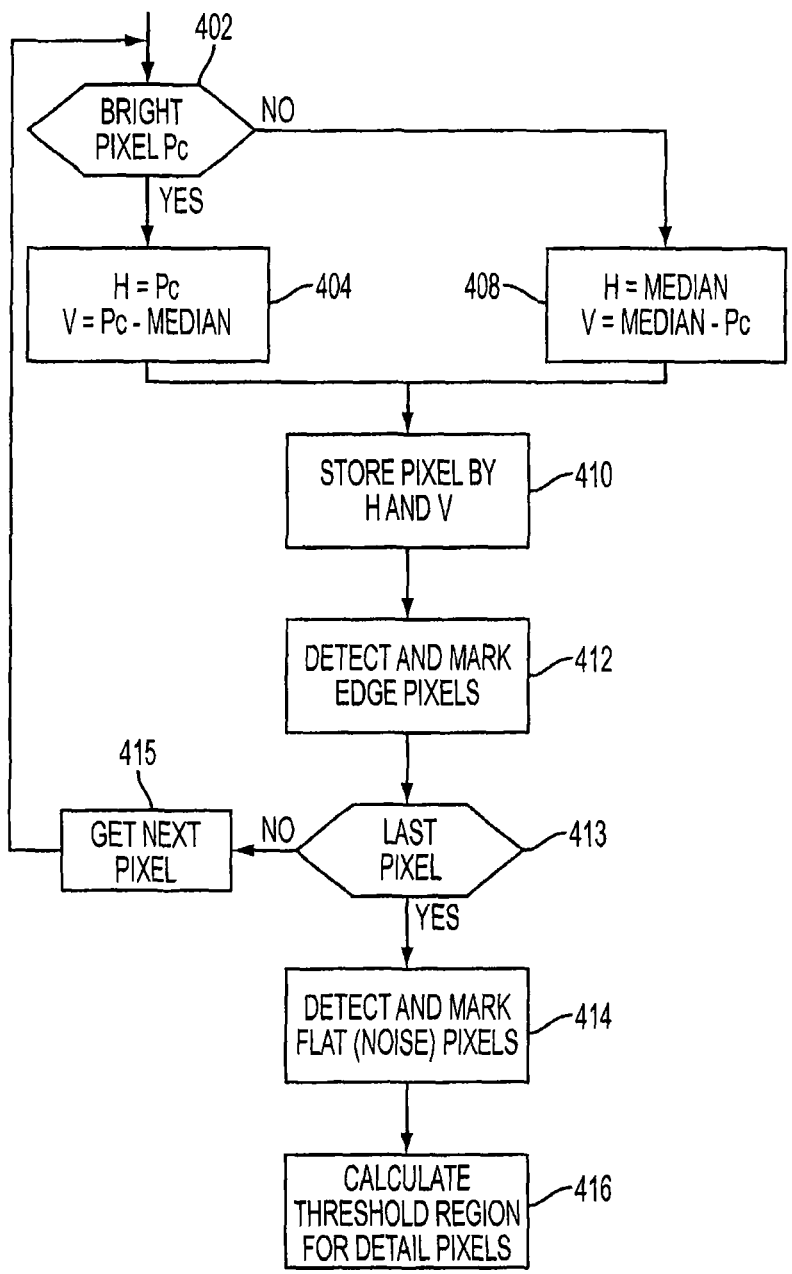
FIG. 4 is a flow-chart diagram of an example image analysis process.

FIG. 4 is a flow-chart diagram of an example image analysis process. The process shown in FIG. 4 is applied to the center pixel 300 comparing it to the surrounding pixels 302A-302H as shown in FIG. 3. The first step in the process 402 determines if the pixel Pc is a bright pixel. Pc is a bright pixel if the value of the pixel 300 is greater than or equal to the median value of the pixels 300 and 302A-302H in the block. The next step, 404 sets a temporary variable H to the value of the pixel Pc and a temporary variable V to Pc-median. If, step 402 determines that pixel Pc is not a bright pixel then it is a dark pixel (i.e. its value is less than the median in the block). If the pixel is determined to be a dark pixel at step 402, step 408 sets H to be the median value for the block and sets V to be the value median−Pc.

The next step after step 404 or 408 is step 410 which stores the pixel value Pc by the values H and V. This storage is a two-dimensional memory in which the first dimension is H and the second dimension has a number of cells at least equal to the number of pixels in the image having the value H. Each pixel may be stored in this array including its address in the image array and its value V. In addition, the median, next to largest and next to smallest pixel values for the block including the pixel Pc may be stored with the pixel value Pc in this memory.

After step 410, the process, at step 412 detects and marks edge pixels in the image. The edge pixel algorithm is described below with reference to FIG. 5. After step 412, the process determines if pixel Pc is the last pixel in the image. If it is not, then step 415 obtains the next pixel Pc and repeats steps 402-412 until, at step 413, the last pixel is processed.

After processing the last pixel, step 414 is determines a measurement to identify flat areas in the image by retrieving a value nine times the standard deviation of the noise distribution (9*Sigma) for each pixel in the image. The value The 9*Sigma curve is shown as curve 906 in FIG. 9. The values that make up this curve are determined by testing the imager to define its noise distribution. This testing may be a part of the manufacturing process. The 9*Sigma curve is used as described below with reference to FIG. 9. While the subject invention uses the function 9*Sigma as a function delimiting flat areas of the image, it is contemplated that other multiples, N, of the standard deviation of pixel noise may be used or other measurements of image nose may be used.

After step 414, step 416 calculates the slope and threshold functions that may be used to define the detail pixels of the image, as described below with reference to FIG. 9. The algorithm for calculating the threshold and slope regions is described below with reference to FIGS. 6, 6A and 7.

Figure 5:
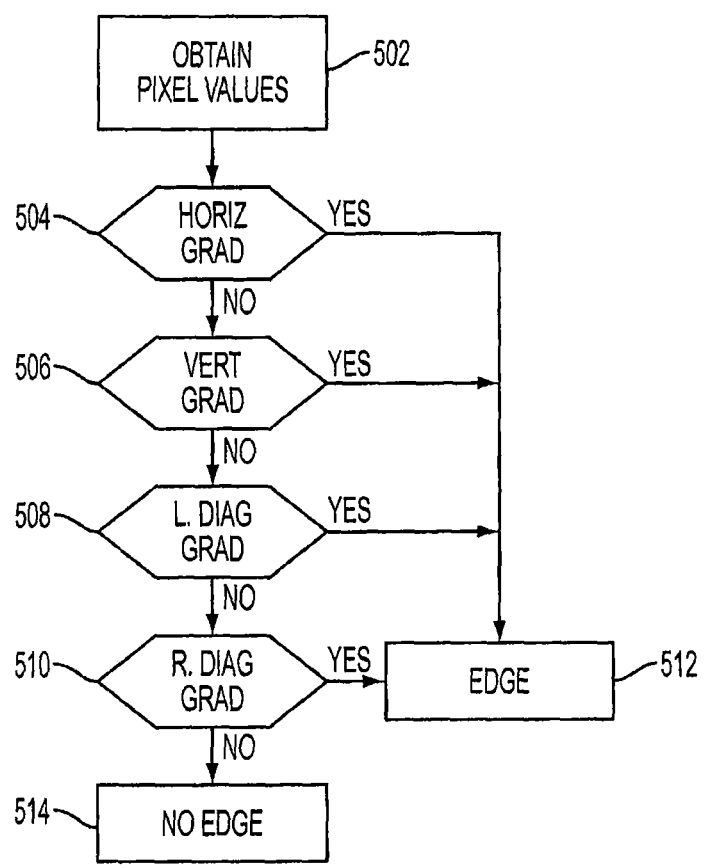
FIG. 5 is flow-chart diagram of an example edge detection algorithm suitable for use in the image analysis process shown in FIG. 4.

FIG. 5 is a flow-chart diagram which illustrates an edge detection algorithm suitable for use in the example embodiment. The first step in this process is step 502 which obtains the pixel values 300 and 302A-302H. The next step 504 in the process determines if the block of pixels has a horizontal gradient. This may be done for example by comparing values of pixels 302A, B and C to pixels 302E, F, and G. In an example embodiment, the method generates an average of the pixels 302A, B and C and an average of the pixels 302E, F and G and compares the absolute value of the difference between the two these average values to a threshold. If the absolute value is greater than the threshold then the block includes a horizontal edge and control transfers to step 512 which marks the pixel Pc as an edge pixel.

If the value of this average is not greater than threshold at step 504, then step 506 is executed to determine if there is a vertical gradient. The vertical gradient operates similarly to the horizontal gradient by comparing pixels 302C, D and E to pixels 302G, H and A. If the process determines that there is a vertical gradient then control transfers to step 512 which marks the pixel 300 as being an edge pixel.

If that step 506 process determines that there is no vertical gradient then step 508 is executed to determine if there is a left diagonal gradient. Step 508 compares the values of pixels 302B, C and D to the value of pixels 302F, G and H. If the absolute value of the difference between these two groups of pixels is greater than the threshold then control transfers to step 512 to define Pc as an edge pixel.

If, at step 508, the left diagonal gradient is not found then control transfers to step 510 which determines if there is a right diagonal gradient. Step 510 operates similarly to step 508 except in step 510 pixels 302D, E and F are compared to pixels 302A, B and H. If, at step 510, the absolute value of the difference between pixels 302D, E and F and 302A, B and H is not greater than the threshold then control transfers to step 514 and the pixel 300 is not marked as being an edge pixel.

Figure 8:
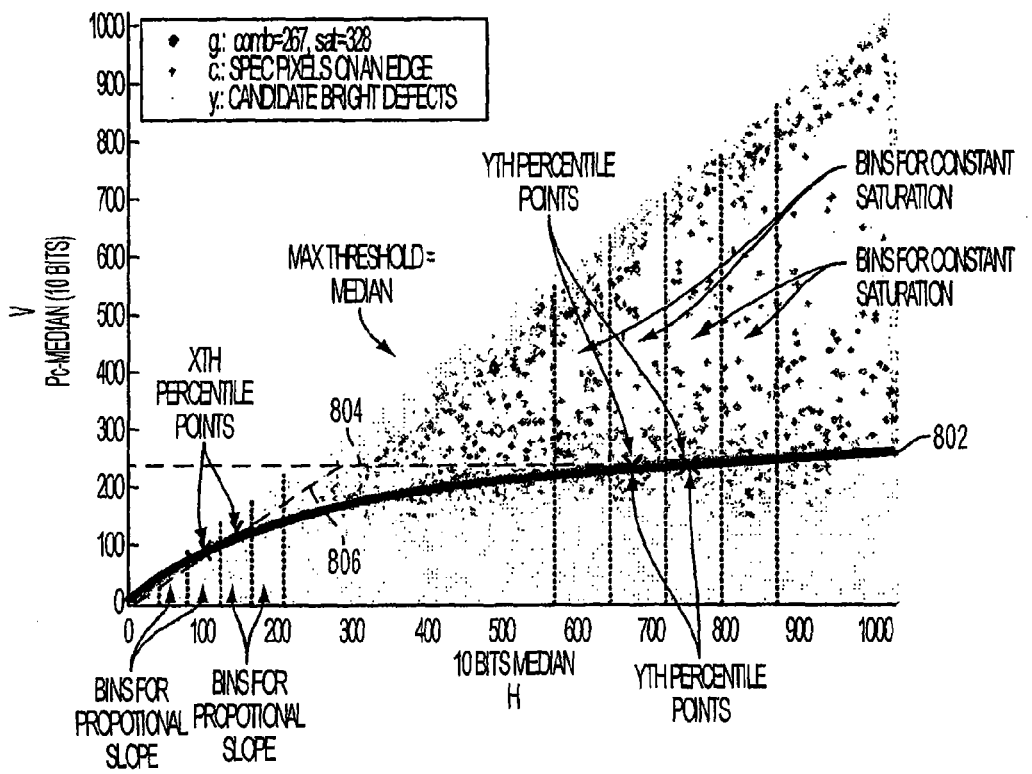
FIGS. 8 and 9 are scatter plots that are useful for describing the process shown in FIGS. 4-7.
Figure 9:
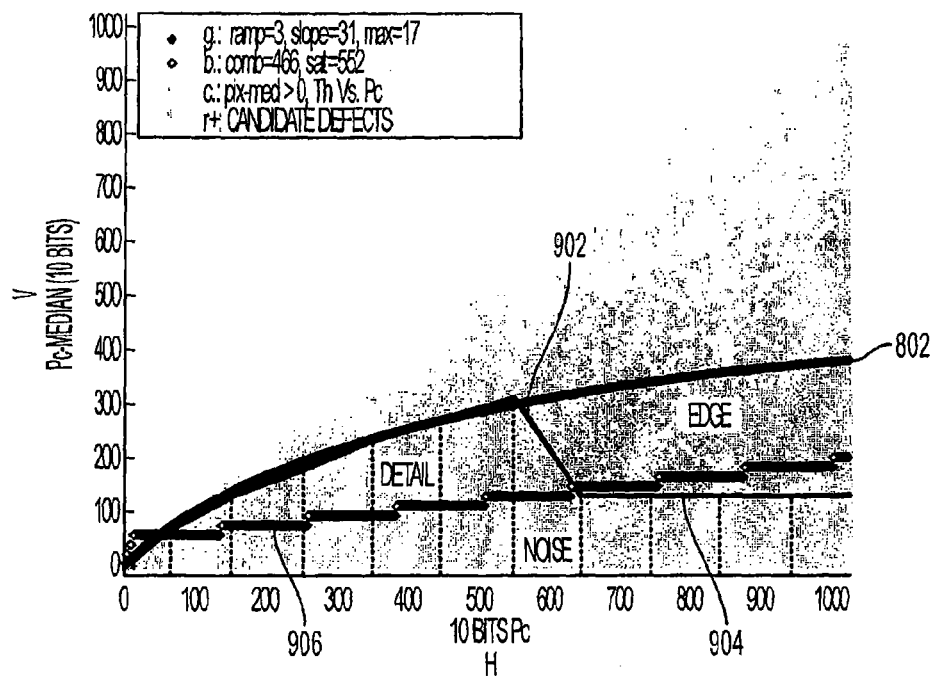

The slope and threshold values calculated in step 416 of FIG. 4 define the curve 802, shown in FIGS. 8 and 9. This curve is used to distinguish image detail pixels from pixels in flat areas of the image. For pixels in flat areas, any large variation in a pixel value from the median value for the block is likely to be the result of noise. Pixels in image detail regions, however, may have relatively large deviations that are not the result of noise. Because there is more variation in pixel values in the detail areas of the image, noise may be less visible than in flat areas of the image. Thus, the ability to classify pixels as noise pixels, detail pixels and edge pixels allows a more robust noise reduction scheme to be used. Pixel filtering may be changed depending on the classification of the pixel such that noise pixels in flat areas of the image may be filtered more aggressively than pixels in detail areas and edge pixels may not be filtered at all.

As described above, the classification of image pixels classified as edge, noise and detail has many applications. For example, pattern recognition algorithms may use this information to identify a pattern in the image. The level of detail in the image may also be used to determine focus quality. This may be especially useful for images having few edges such that the high-spatial-frequency content of the image would not provide a good indication of focus quality.

Figure 6:
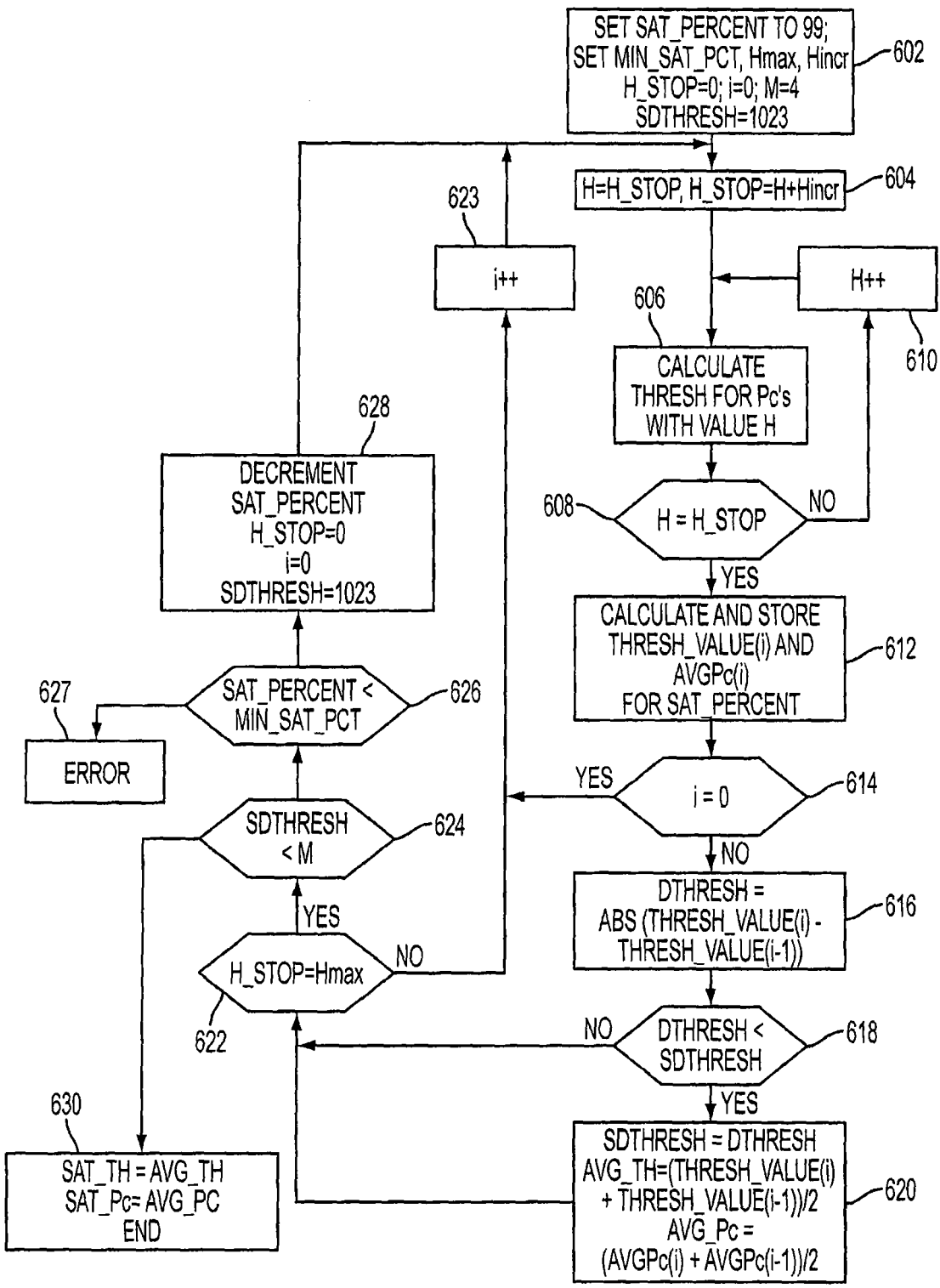
FIG. 6 is a flow-chart diagram of an example threshold calculation method suitable for use with the image analysis process shown in FIG. 4.
Figure 6A:
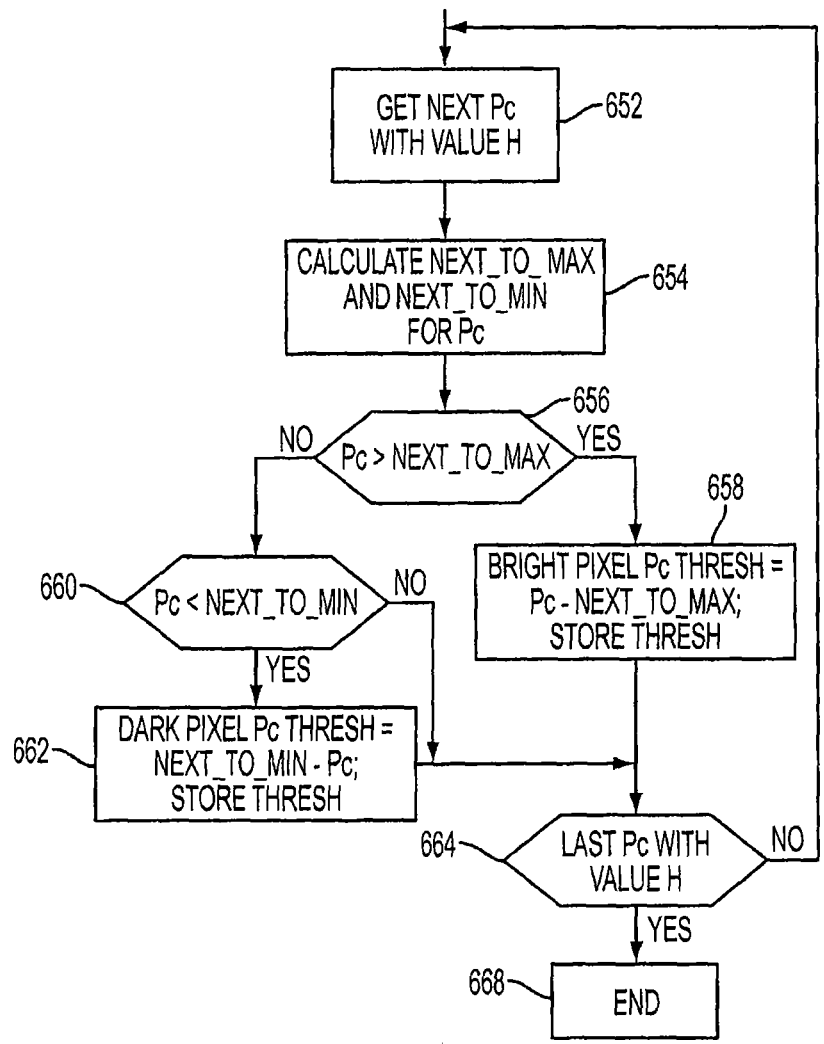
FIG. 6A is a flow-chart diagram of a method for calculating a threshold value for a particular saturation percentile suitable for use with the method shown in FIGS. 6 and 7.
Figure 7:
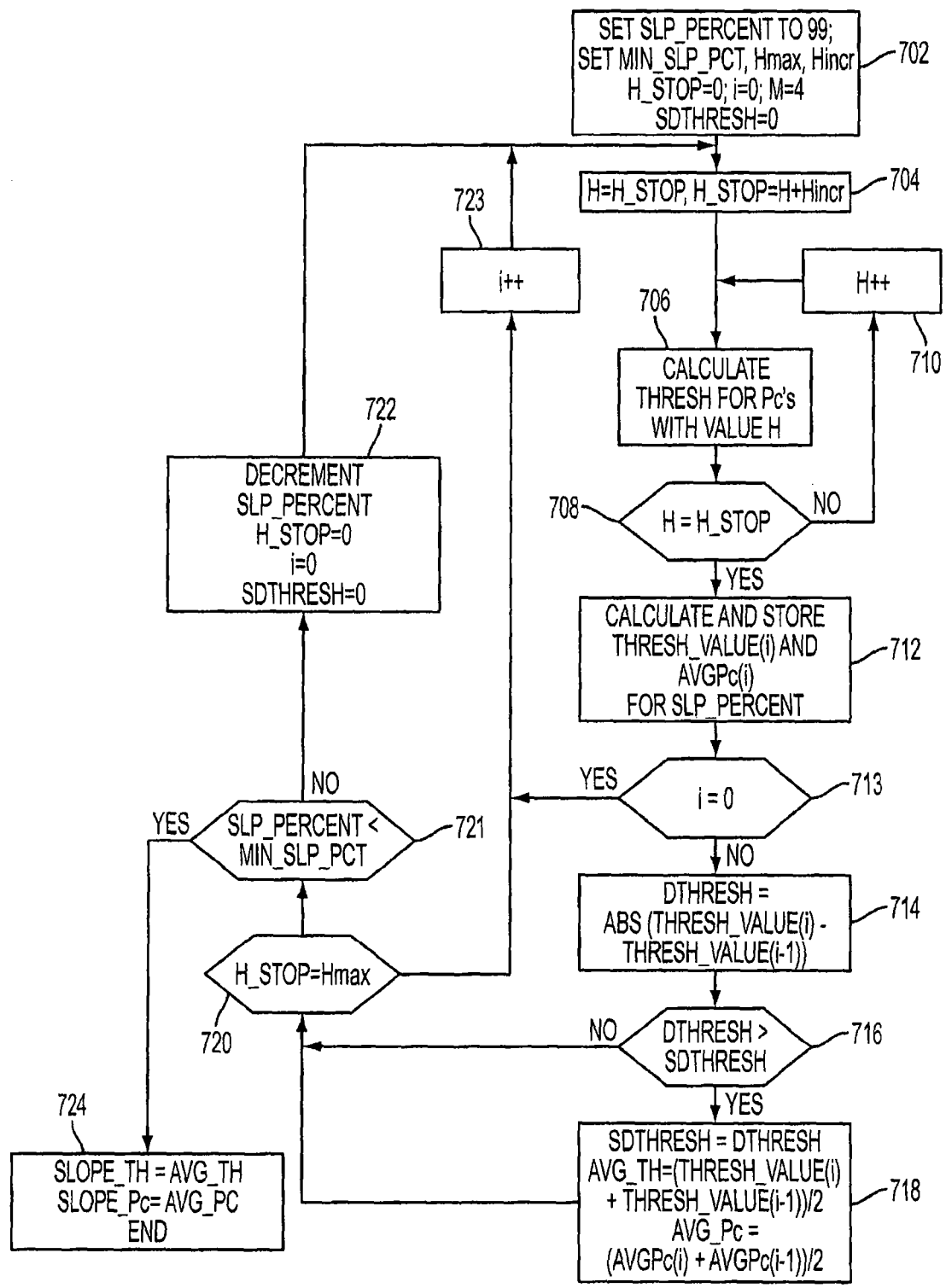
FIG. 7 is a flow-chart diagram of an example slope calculation method suitable for use with the image analysis process shown in FIG. 4.

FIGS. 6, 6A and 7 are flow-chart diagrams of example algorithms may be used to calculate the threshold value and slope value used, as described below, to define the detail pixels. The algorithms shown in FIGS. 6, 6A and 7 operate on the stored pixel values from step 410 of FIG. 4. The scatter plot shown in FIG. 8 illustrates these stored pixels. This scatter plot has the values H on the horizontal axis and V on the vertical axis. Each dot on the scatter plot represents a pixel Pc of the image. The threshold value is the dashed line 804 shown if FIG. 8 and the slope value is the line 806. The function defined by the line 802 as described below with reference to FIG. 9, defines image pixels corresponding to image detail.

The first step in the process shown in FIG. 6 is to set the saturation percentile, SAT_PERCENT to 99. Step 602 also sets a minimum saturation percentile, MIN_SAT_PCT, a value for Hmax and a value for Hincr. Hmax is the maximum value of H in the image. For a 10-bit pixel, this value may be 1023. Step 602 also sets several working variables: H_STOP to zero, i to zero and SDTHRESH to 1023.

The storage array, generated in step 410 of the flow-chart shown in FIG. 4, has all of the pixels in the image arranged in terms of their H and V values in a manner similar to that shown in the scatter plots of FIGS. 8 and 9. The values Hmax, Hincr, H_STOP and i are used to define bins of pixels in the image. Hincr defines a number of consecutive values of H that are in a bin. In an example, Hincr may be 10. In step 604 H is set to H_STOP and H_STOP is set to H plus Hincr. This defines the bin that is currently being processed.

Step 606 calculates the threshold value for pixel values Pc having a value of H. The algorithm for calculating the threshold value is described below with reference to FIG. 6A. Next, step 608 is executed to determine if H equals H_STOP. If it does not then there are more pixels in the bin to be analyzed and control transfers to step 610 to increment H and repeats steps 606 and 608 with the new value of H.

If, at step 608 H is determined to be equal to H_STOP, then step 612 is executed which calculates and stores the threshold value THRESH_VALUE(i) and the average value of Pc, AVGPc(i) for the current saturation percentile SAT_PERCENT. These values are: 1) the value of the threshold that is met by the current saturation percentile of pixels in the bin and 2) the average pixel value in the bin. for the first bin in the first pass THRESH_VALUE(0) would be the threshold value that is met by 99 percent of the pixels in bin 0.

Next step 614 determines if i=0. If it does, there is no previous threshold value to compare to. Thus, control transfers to step 604 which sets H to H_STOP and sets H_STOP to H plus Hincr. These values define a new bin to be used to calculate the next saturation threshold percentile, THRESH_VALUE(i+1). Accordingly, step 623 increments the indexing variable i. Steps 606, 608, 610 and 612 are repeated for this next bin.

At step 614, after this next bin has been processed, i will no longer be equal to 0 and step 616 is executed. Step 616 sets differential threshold value DTHRESH equal to the absolute value of the difference between the threshold value for the current bin, THRESH_VALUE(i) and the threshold value for the previous bin, THRESH_VALUE(i−1). At step 618 DTHRESH is compared to the value SDTHRESH to determine which is less. If DTHRESH is less than SDTHRESH then step 620 is executed which sets SDTHRESH to DTHRESH. It also sets an average threshold value, AVG_TH to (THRESH_VALUE(i)+THRESH_VALUE(i−1))/2 and sets AVG_Pc to (AVGPc(i)+AVGPc(i−1))/2. After step 620 step 622 is executed which determines if H_STOP is equal to Hmax. If H_STOP is equal to Hmax then all of the pixels in the image have been processed and control transfers to step 624. If H_STOP is not equal to Hmax then control transfers to step 623 which increments i and branches to step 604 to analyze the pixels in the next bin.

If at step 622 all of the pixels have been analyzed then step 624 is executed to determine if SDTHRESH is less than the minimum threshold value M. If it is then control transfers to step 630 that sets SAT_TH to AVG_TH and sets SAT_Pc to AVG_Pc and the process is complete. These values are used, as described below to calculate a function corresponding to the curves 802, shown in FIGS. 8 and 9. If, at step 624, SDTHRESH is not less than M, then control transfers to 626 which compares the current saturation percentile, SAT_PERCENT to the minimum saturation percentile value, MIN_SAT_PCT set at step 602. If the current saturation percentile is less than MIN_SAT_PCT, then an error has occurred and the process ends at step 627. If the current saturation percentile is not less than MIN_SAT_PCT then control transfers to step 628 which decrements the saturation percentile value, sets H_STOP to zero, i to zero and SDTHRESH to 1023. Control then transfers to step 604 to analyze the entire image with the reduced saturation percentile value.

The values produced by the process shown in FIG. 6 follow the curve 802, shown in FIG. 8 until the two points labeled Yth percentile points are found. These points are consecutive bin threshold values that differ by less than M. These values define a relatively flat part of the curve 802. The values are averaged (AVG−TH) to define the threshold value SAT_TH for the image, as described below.

FIG. 6A is a flow-chart diagram which illustrates the calculation of the threshold value for all of the pixels Pc having value H. At step 652 the process obtains the next pixel Pc with the value H. The pixels Pc that are analyzed are those that have not been identified as edge pixels. Step 654 calculates the value of NEXT_TO_MIN and NEXT_TO_MAX for the pixel value Pc based on its surrounding pixels, as shown in FIG. 3. Alternatively, if these values were stored in the memory at step 410 of FIG. 4, they may be retrieved from the memory at step 654. Step 654 then determines if Pc is greater than NEXT_TO_MAX. If it is, then pixel Pc is a bright pixel. At step 658 the pixel threshold, THRESH, is set to (Pc−NEXT_TO_MAX). Step 658 also stores threshold value THRESH. If at step 656 Pc is not greater than NEXT_TO_MAX then step 660 is executed which determines if pixel Pc is less than NEXT_TO_MIN. If pixel Pc is less than NEXT_TO_MIN then the pixel is a dark pixel and THRESH is set to (NEXT_TO_MIN−Pc). Also at step 662, THRESH is stored. After step 658 or step 662, step 664 determines if the current pixel Pc is the last pixel having a value H. If it is not than control transfers to step 652 which obtains the next pixel having the value H and repeats the process to store the threshold value for that pixel. If at step 664 the pixel Pc is determined to be the last pixel having the value H then the process ends at step 668. The stored threshold values are used, in the process described in FIG. 6, to determine the average value of Pc for the bin and the threshold value that satisfies the current saturation percentile.

Step 416 of FIG. 4 also calculates the value for the slope 806, shown in FIG. 8. FIG. 7 is a flow-chart diagram which describes an example algorithm for calculating the slope value. The first step in the algorithm step 702 sets the current saturation percentile for the slope calculation, SLP_PERCENT, to 99 and sets a minimum percentile value, MIN_SLP_PCT. In addition, step 702 sets variables Hmax and Hincr as described above with reference to FIG. 6. Step 702 also sets H_STOP to zero, i to zero and SDTHRESH to zero. In an example embodiment having 10-bit pixel values, MIN_SLP_PCT may be set to 30 and Hmax may be set to 200.

Next at step 704 the process sets H to H_STOP and sets H_STOP to H plus Hincr. These values define the bin of pixel values that is to be evaluated in this pass of the algorithm. Step 706 calculates the slope threshold value for pixels, Pc, having a value H. This algorithm is described above with reference to FIG. 6A. After the slope threshold value is calculated in step 706, step 708 determines if H is equal to H_STOP. If H is not equal to H_STOP, then there are more pixels in the bin defined by H and H_STOP, and control transfers to step 710 to increment the value of H and repeat steps 706 and 708. If, at step 708, H is equal to H_STOP then step 712 is executed which calculates the threshold value for the bin, THRESH_VALUE (i), and the average pixel value in the bin, AVGPc(i), for the current saturation percentile values.

Step 713 then determines if i=0. If it does then there is no earlier bin and control transfers to step 723 to increment i and process the pixel values in the next bin. On the next pass through the process shown in FIG. 7, i will not be 0 and step 714 will be executed which calculates the difference between the threshold for the current bin, THRESH_VALUE(i) and the threshold value for the previous bin, THRESH_VALUE (i−1).

Step 716 compares DTHRESH to SDTHRESH. If DTHRESH is greater than SDTHRESH then step 716 is executed and SDTHRESH is set to DTHRESH, AVG_TH is set to (THRESH_VALUE(i)+THRESH_VALUE(i−1))/2 and AVG_PC is set to (AVGPc(i)+AVGPc(i−1)/2). After step 718 or after step 716 if DTHRESH is not greater than SDTHRESH, step 720 compares H_STOP to Hmax. If H_STOP is not equal to Hmax than control transfers to step 723 in which i is incremented. After step 723, control transfers to step 704 which defines the next bin and calculates the average threshold value and average pixel value for the next bin.

If H_STOP is equal to Hmax at step 720 then step 721 is executed to determine if the current saturation percentile is less than the minimum saturation percentile. If it is not, then step 722 is executed which decrements the slope percentile value, SLP_PERCENT, resets H_STOP to zero, i to zero and SDTHRESH to zero. After step 722, control transfers to step 704 to repeat the process for the next lower saturation percentile value. If, at step 721, SLP_PERCENT is less than MIN_SLP_PCT, then, at step 724, SLOPE_TH is set to AVG_TH, SLOPE_Pc is set to AVG_PC and the process ends.

The result of FIG. 7 is the identification of the average threshold value and average pixel value at points "Xth percentile points," shown in FIG. 8. These points correspond to a maximum slope of the curve 802.

Once the saturation pixel value (SAT_Pc), slope pixel value (SLOPE_Pc), saturation threshold value (SAT_TH) and slope threshold value (SLOPE_TH) have been calculated as described above with reference to FIGS. 6, 6A and 7, the next step is to determine the SATURATION and COMB for the image. These values are calculated as shown in equations (1) and (2).

$$\text{SATURATION} = (SAT\_Pc - SLOPE\_TH) * SAT\_TH * SLOPE\_TH / (SAT\_Pc * SLOPE\_TH - SLOPE\_Pc * SAT\_TH) \quad (1)$$

$$\text{COMB} = (SAT\_TH - SLOPE\_TH) * SAT\_Pc * SLOPE\_Pc / (SAT\_Pc * SLOPE\_TH - SLOPE\_Pc * SAT\_TH) \quad (2)$$

The values SATURATION and COMB define the curve 802 shown in FIG. 8.

While the curve 802 shown in FIG. 8 is useful the inventor has determined that with a slight modification of the algorithm above a more useful curve 902 as shown in FIG. 9 may be obtained. To obtain this curve, the saturation algorithm does not stop when the difference between two threshold values is less than M at step 624. Instead the algorithm continues to calculate the threshold value for each bin as shown in FIG. 9. Because the edge pixels are ignored and because the edge pixels tend to be concentrated in the higher values of H, the threshold value exhibits a drop as shown by the slanted line 902 and the horizontal line 904.

The inventor has determined that the pixels corresponding to the values below the 9*Sigma curve 906 and the curve 904 corresponds to flat areas of the image. Any variation in these pixel values that is greater than a threshold value corresponds to noise. Pixels having values greater than the 9*Sigma curve 906 but less than the curve 802 correspond to detail in the image. Pixel values greater than the curve 902 and 904 correspond to edge pixel values.

In summary, a method of classifying pixels in an image is described that includes calculating for each target pixel in the image, a functional value based on a median value of a block of pixels including the target pixel and storing the functional value for each pixel. Pixels in the image are then analyzed to determine if they correspond to edges in the image and if so, are classified as edge pixels. Next the stored functional values are analyzed to define a noise delimiting function for the image. The stored functional values that do not correspond to edge pixels are then analyzed to define an image detail delimiting function and the non-noise pixels are classified as being either noise pixels or detail pixels based on the noise delimiting function and the detail delimiting function.

While the invention has been described in terms of example embodiments, it is contemplated that it may be practiced as described above with variations within the scope of the following claims.

What is claimed:

1. A method of classifying pixels in an image comprising:
    calculating, using a processor, for each target pixel in the image, a functional value based on a median value of a block of pixels including the target pixel;
    identifying ones of the pixels in the image corresponding to edges in the image and classifying the identified pixels as edge pixels;
    analyzing, using the processor, the stored functional values for pixels in the image that are not edge pixels to define an image detail delimiting function for the pixels in the image; and
    classifying the pixels that are not classified as edge pixels as either flat area pixels or detail pixels based on a predetermined flat area pixel delimiting function and the image detail delimiting function.

2. The method of claim 1, wherein the flat area delimiting function defines the pixel as a flat area pixel if the stored functional value is less than N times the standard deviation of noise for the target pixel.

3. The method of claim 2 including testing the imager to determine the standard deviation of noise for each pixel in the imager.

4. The method of claim 2, where N equals 9.

5. The method of claim 1, wherein calculating the functional value for the target pixels includes:
    defining the block of pixels to include the target pixels and a plurality of pixels surrounding the target pixel and having a same color as the target pixel;
    determining a median value of the target pixel and the plurality of surrounding pixels in the block;
    if the target pixel is greater than or equal to the median value, determining an H value for the target pixel as H equals the pixel value and determining a V value for the pixel as V equals the pixel value of the target pixel minus the median value;
    if the target pixel is less than the median value, determining the H value for the target pixel as H equals the median value of the block of pixels including the target pixel and determining the V value for the pixel as V equals the median value of the block of pixels minus the pixel value of the target pixel; and
    storing, for the target pixel, the target pixel value, the H value for the target pixel, the V value for the target pixel and a location in the image of the target pixel.

6. The method of claim 1, wherein the analyzing of the stored functional values to define the detail delimiting function includes:
    analyzing the stored functional values to define a slope threshold value and a slope pixel value;
    analyzing the stored functional values to define a threshold value and a threshold pixel value; and
    calculating the detail delimiting function based on the slope threshold value, slope pixel value, threshold value and threshold pixel value.

7. The method of claim 6, further including binning the stored functional values prior to analyzing the stored functional values.

8. The method of claim 7, wherein analyzing the functional values to define the threshold value and the threshold pixel value includes:
   a) analyzing successive bins of functional values to determine respective threshold values satisfied by P percent of the pixels in each bin and an average pixel value for each bin;
   b) comparing the successive threshold values calculated for the successive bins to determine if the threshold values differ by less than a minimum difference value, M;
   c) if the threshold values differ by less than M, setting the threshold value to an average of the threshold values for the successive bins and setting the threshold pixel value to an average of the threshold pixel values for the successive bins; and
   d) if the threshold values do not differ by less than M, reducing the percentage value P and repeating steps a) through d) until the threshold values differ by less than M.

9. The method of claim 7, wherein analyzing the functional values to define the slope value and the slope pixel value includes:
   a) analyzing successive bins of functional values to determine respective threshold values satisfied by P percent of the pixels in each bin and an average pixel value for each bin;
   b) comparing successive threshold values calculated for successive bins to determine a maximum difference between the successive threshold values;
   c) reducing the percentage value P and repeating steps a) through c) until the percentage value P is less than a minimum percentage value P; and
   d) providing the slope threshold value corresponding to an average of the threshold values for the successive bins corresponding to the maximum difference between successive threshold values and providing the slope pixel value corresponding to an average of the respective average pixel values for the successive bins corresponding to the maximum difference between successive threshold values.

10. A method according to claim 1 for correcting pixel values in an imager comprising:
   if the pixel is classified as a flat area pixel, applying a first pixel correction algorithm;
   if the pixel is classified as a detail pixel, applying a second pixel correction algorithm, different from the first pixel correction algorithm; and
   if the pixel is classified as an edge pixel, applying a third pixel correction algorithm, different from the first and second pixel correction algorithms.

11. Apparatus for classifying pixels in an image comprising:
   means for calculating for each target pixel in the image, a functional value based on a median value of a block of pixels including the target pixel;
   means for identifying ones of the pixels in the image corresponding to edges in the image and for classifying the identified pixels as edge pixels;
   means for analyzing, using the processor, the stored functional values for pixels in the image that are not edge pixels to define an image detail delimiting function for the pixels in the image; and
   means for classifying the pixels that are not classified as edge pixels as either flat area pixels or detail pixels based on a predetermined flat area pixel delimiting function and the image detail delimiting function.

12. The apparatus of claim 11, wherein the flat area delimiting function defines the pixel as a flat area pixel if the stored functional value is less than N times the standard deviation of noise for the target pixel.

13. The apparatus of claim 12 further including means for testing the imager to determine the standard deviation of noise for each pixel in the imager.

14. The apparatus of claim 12, where N equals 9.

15. The apparatus of claim 11, wherein the means for calculating the functional value for the target pixels includes:
   means for defining the block of pixels to include the target pixels and a plurality of pixels surrounding the target pixel and having a same color as the target pixel;
   means for determining a median value of the target pixel and the plurality of surrounding pixels in the block;
   means for determining if the target pixel is greater than or equal to the median value, and for determining an H value for the target pixel as H equals the pixel value and for determining a V value for the pixel as V equals the pixel value of the target pixel minus the median value;
   means for determining if the target pixel is less than the median value, and for determining the H value for the target pixel as H equals the median value of the block of pixels including the target pixel and for determining the V value for the pixel as V equals the median value of the block of pixels minus the pixel value of the target pixel; and
   means for storing, for the target pixel, the target pixel value, the H value for the target pixel, the V value for the target pixel and a location in the image of the target pixel.

16. The apparatus of claim 11, wherein the means for analyzing of the stored functional values to define the detail delimiting function includes:
   means for analyzing the stored functional values to define a slope threshold value and a slope pixel value;
   means for analyzing the stored functional values to define a threshold value and a threshold pixel value; and
   means for calculating the detail delimiting function based on the slope threshold value, slope pixel value, threshold value and threshold pixel value.

17. The apparatus of claim 16, further including means for binning the stored functional values prior to analyzing the stored functional values.

18. The apparatus of claim 17, wherein the means for analyzing the functional values to define the threshold value and the threshold pixel value includes:
   means for analyzing successive bins of functional values to determine respective threshold values satisfied by P percent of the pixels in each bin and an average pixel value for each bin;
   means for comparing the successive threshold values calculated for the successive bins to determine if the threshold values differ by less than a minimum difference value, M; and
   means for determining if the threshold values differ by less than M, and for setting the threshold value to an average of the threshold values for the successive bins and setting the threshold pixel value to an average of the threshold pixel values for the successive bins.

19. The apparatus of claim 17, wherein the means for analyzing the functional values to define the slope threshold value and the slope pixel value includes:
   means for analyzing successive bins of functional values to determine respective threshold values satisfied by P percent of the pixels in each bin and an average pixel value for each bin;

means for comparing successive threshold values calculated for successive bins to determine a maximum difference between the successive threshold values;

means for providing the slope threshold value corresponding to an average of the threshold values for the successive bins corresponding to the maximum difference between successive threshold values and providing the slope pixel value corresponding to an average of the respective average pixel values for the successive bins corresponding to the maximum difference between successive threshold values.

\* \* \* \* \*